United States Patent [19]

Durante et al.

[11] Patent Number: 5,221,464

[45] Date of Patent: Jun. 22, 1993

[54] PROCESS FOR CATALYTICALLY REFORMING A HYDROCARBON FEED IN THE GASOLINE BOILING RANGE

[75] Inventors: Vincent A. Durante, West Chester; Aristides Macris, Media; Rangasamy Pitchai, West Chester, all of Pa.; Xenophon E. Verykios, Patras, Greece

[73] Assignee: Sun Company, Inc. (R&M), Philadelphia, Pa.

[21] Appl. No.: 743,658

[22] Filed: Aug. 12, 1991

[51] Int. Cl.⁵ .............................................. C10G 35/08
[52] U.S. Cl. .................................... 208/137; 208/134; 208/135; 208/136; 208/138; 208/141

[58] Field of Search ............... 208/134, 135, 136, 137, 208/138, 141

[56] References Cited

U.S. PATENT DOCUMENTS 4,082,696 4/1978 Robinson ............................ 208/138
4,199,438 4/1980 Antos .................................. 208/139

Primary Examiner—Helane Myers
Attorney, Agent, or Firm—Q. Todd Dickinson; Donald R. Johnson

[57] ABSTRACT

Supports for catalytic reforming catalysts are prepared by doping $ZrO_2$ with tantalum. The catalyst may contain a Group VII or Group VIII metal and/or an acidic component.

12 Claims, No Drawings

PROCESS FOR CATALYTICALLY REFORMING A HYDROCARBON FEED IN THE GASOLINE BOILING RANGE

BACKGROUND OF INVENTION

Catalytic reforming, or hydroforming, is a well established refinery process for improving the octane quality of naphthas or straight run gasolines. Reforming can be defined as the total effect of the molecular changes, or hydrocarbon reactions, produced by dehydrogenation of cyclohexanes, and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst. In catalytic reforming, a multi-functional catalyst is usually employed which contains a metal hydrogenation-dehydrogenation (hydrogen transfer) component deposited on a porous, inorganic oxide acidic support.

All of the reforming catalysts in general use today contain platinum supported on an alumina or an alumina-silica base. In many cases, rhenium is combined with platinum to form a more stable catalyst which permits operation at lower pressures. The platinum is thought to serve as a catalytic site for hydrogenation and dehydrogenation reactions and halogenated alumina provides an acid site for isomerization, cyclization, and hydrocracking reactions. Halide, particularly chloride, is known to be a catalyst promoter when added to a reforming catalyst.

Zirconium oxide is also known as a support for platinum reforming catalysts but it has not achieved commercial success.

SUMMARY OF INVENTION

We have discovered a means of making highly effective zirconium oxide based reforming catalysts. The method involves doping the zirconium oxide with a small amount of tantalum.

DETAILED DESCRIPTION OF INVENTION

Our invention is a zirconium oxide based reforming catalyst and the use thereof in reforming. Zirconium oxide ($ZrO_2$) is an article of commerce and readily available. It exists as a lattice of zirconium atoms and oxygen atoms and the term "doping" in the art refers to the replacing of zirconium ion in the lattice with an ion of another metal, which in the present cases, is tantalum. Thus, doping is to be distinguished from, say, merely laying down tantalum or compounds of tantalum on the surface of zirconium oxide particles.

Our zirconium oxide support is doped with 0.1–20% tantalum, preferably 0.5–10%, more preferably 1–5%. The doped zirconium is readily prepared by mixing appropriate amounts of compounds of the two metals followed by drying and calcining. This is shown in the examples which follow.

Our catalysts will normally contain platinum but can also contain other group VII or VIII metals, such as iridium, rhenium, nickel, ruthenium, iron, manganese, etc. Many of these are known, alone or in combination, reforming catalyst components. The amount of the Group VII or VIII metal will be 0.05–20%, usually 0.1–10%.

In order to achieve the full benefits of the catalyst for reforming, an acidic component such as chlorided alumina can be combined with the doped zirconium oxide, usually in a ratio of the former to the latter of 0.1:1 to 0.9:1. The amount of chloride on the alumina is usually 0.01–2%. Other methods of imparting acidity to the zirconium oxide can also be used. See for example the sulfating procedures described in U.S. Pat. Nos. 4,956,519 and 4,918,041, which may be applied to the catalyst used in the process of the invention by sulfating cohydrolyzed zirconium and tantalum prior to calcining.

Reforming operations with our catalysts can be carried out in known manner. Suitable feedstocks for reforming in accordance with the instant invention are any hydrocarbonaceous feedstock boiling in the gasoline range. Examples of such feedstocks include the light hydrocarbon oils boiling from about 70° to about 500° F., preferably from about 180° to about 400° F. Examples of such feedstocks include straight run naphtha, synthetically produced naphtha, thermally or catalytically cracked naphtha, hydrocracked naphtha, or blends or fractions thereof. Reforming is usually carried out at 500°–1500° C. at a hydrogen to hydrocarbon ratio of 1:1–10:1, usually 2:1–5:1. Pressures of 100–1000 psig and a LHSV of 1–3 are customary for semi-regenerative units. Lower pressures are customary for continuously regenerating units.

EXAMPLES

The doped zirconias were prepared by cohydrolysis of zirconium n-propoxide and tantalum ethoxide by mixing solutions of these in isopropanol to appropriate proportions of Zr:Ta. These alkoxides were purchased. The combined solutions were added dropwise with stirring to a solution of a slight excess of NH4OH in water/isopropanol solvent. Temperature was maintained at about 30° C. by a cold water jacket for one hour while stirring. The precipitate was then filtered and dried overnight at 110° C. followed by calcination in a static bed in air at 900° C. for five hours.

To prepare the catalyst, a 250 ml beaker was charged with the appropriate quantity of a solution of chloroplatinic acid which was then diluted with water. While this solution was being stirred, the required amount of support was added and stirring continued for about one half hour to allow the solution to soak into the catalyst carrier. This was followed by gentle heating until most of the water was evaporated and stirring became difficult. Heating was reduced and maintained until the water had almost completely evaporated. The resulting solid residue was dried in an oven at about 100° C. to remove any remaining water.

To reduce the metal compounds, the catalyst was heated at 200° C. for one hour in nitrogen flow. After the last traces of water were driven off, the solid was reduced in hydrogen flow at the same temperature for five hours. Subsequent to reduction, the catalyst was cooled in nitrogen flow and then stored until use.

Normally, catalysts used were 20 mesh size pellets. However, when alumina was added as a physical mixture, the initial mixing of the catalyst with alumina was done using powders in a mortar and pestle. The physically mixed samples were then pelletized. The pellets were then broken and sieved to the correct size of 20 mesh.

Reforming studies were carried out with n-heptane at temperatures of about 500° C. and a hydrogen/heptane ratio of 6:1. The pressure was about 150 psig. Results are shown in the Tables below. The rates shown in the Tables are $\times 10^{-3}$ and are per mol of heptane converted per gram of catalyst (exclusive of any added alumina) per hour.

Table 1 shows the effect of 0.5% platinum on $ZrO_2$ without the further addition of an acidic component. It is evident that the addition of tantalum to the zirconium doubles the dehydrocyclization activity of the zirconium catalyst and increases isomerization as well. Dehydrocyclization refers to the formation of benzene and toluene and isomerization to the formation of isoheptane.

TABLE 1
EFFECT OF DOPING $Pt/ZrO_2$ WITH $Ta_2O_5$

|  | Rate | | |
|---|---|---|---|
| Weight % $Ta_2O_5$ | 0.0 | 1.0 | 2.0 |
| Temperature °C. | 495 | 501 | 494 |
| Dehydrocyclization | 1.07 | 2.72 | 2.44 |
| Isomerization | 0.00 | 0.39 | 1.83 |
| Cracking | 0.00 | 0.00 | 0.00 |
| $C_5$-$C_6$ | 0.00 | 0.00 | 0.00 |
| Toluene | 0.00 | 0.50 | 0.64 |

Table 2 shows the use of 0.5% Pt on 2% $Ta_2O_5$ and on undoped $ZrO_2$ blended 1:1 with chlorided gamma alumina in comparison with a commercial Pt+Re reforming catalyst, PR-8. Excellent sensitivity is observed for dehydrocyclization plus isomerization with little molecular weight reduction or cracking. This translates to a liquid reformate yield increase over Pt/2% $Ta_2O_5$-$ZrO_2$+$Cl/Al_2O_3$ compared to PR-8.

TABLE 2
EFFECT OF ADDITION OF 1% CHLORIDED ALUMINA

| Catalyst | PR-8 | $Pt/ZrO_2$/ 1% Chlorided Alumina | $Pt/ZrO_2$/2% $Ta_2O_5$/ 1% Chlorided Alumina | |
|---|---|---|---|---|
| Temp.° | 498 | 500 | 497 | 500 |
|  | | Rate | | |
| Dehydrocyclization | 13.24 | 7.22 | 9.23 | 9.16 |
| Isomerization | 38.16 | 15.91 | 38.28 | 27.74 |
| Cracking | 5.49 | 2.82 | 2.21 | 3.97 |
| $C_5$-$C_6$ | 9.30 | 4.92 | 5.42 | 5.13 |
| Toluene | 5.10 | 1.77 | 4.31 | 5.27 |

We claim:

1. In a process for catalytically reforming a hydrocarbon feedstock boiling in the gasoline range with a cobalt-free zirconium oxide supported catalyst, the improvement which comprises doping said cobalt-free zirconium oxide with 0.5–10.0 weight percent tantalum.

2. Process according to claim 1 wherein the catalyst also contains a metal selected from Group VII or Group VIII.

3. Process according to claim 2 wherein said metal is platinum or nickel.

4. Process according to claim 1 wherein said catalyst also contains an acidic component.

5. Process according to claim 4 wherein said acidic component is chlorided alumina.

6. Process according to claim 1 wherein said zirconium is sulfated to provide acidity.

7. Process according to claim 1 wherein the temperature is in the range of approximately 500°–1500° C. and the pressure is in the range of approximately 100–1000 psig.

8. In a process for catalytically reforming a hydrocarbon feedstock boiling in the gasoline-range with a catalyst consisting essentially of tantalum, a Group VII or Group VIII metal, an acidic component and a support, the improvement which comprises using tantalum-doped zirconia as the support.

9. Process according to claim 8 wherein said metal is platinum or nickel.

10. Process according to claim 8 wherein said acidic component is chlorided alumina.

11. Process according to claim 8 wherein said zirconium is sulfated to provide acidity.

12. Process according to claim 8 wherein the temperature is in the range of approximately 500°–1500° C. and the pressure is in the range of approximately 100–1000 psig.

* * * * *